(12) United States Patent
Gouin

(10) Patent No.: US 12,252,193 B2
(45) Date of Patent: Mar. 18, 2025

(54) ELECTRIC LINEAR ACTUATOR FOR USE ON A RETRACTABLE WHEEL ASSEMBLY FOR USE ON SNOWMOBILES

(71) Applicant: Steve Gouin, Thetford Mines (CA)

(72) Inventor: Steve Gouin, Thetford Mines (CA)

( * ) Notice: Subject to any disclaimer, the term of this patent is extended or adjusted under 35 U.S.C. 154(b) by 344 days.

(21) Appl. No.: 17/592,644

(22) Filed: Feb. 4, 2022

(65) Prior Publication Data

US 2022/0250694 A1 Aug. 11, 2022

(30) Foreign Application Priority Data

Feb. 5, 2021 (GB) ...................................... 2101668

(51) Int. Cl.
  *B62D 55/04* (2006.01)
  *B62M 27/02* (2006.01)

(52) U.S. Cl.
  CPC ............ *B62D 55/04* (2013.01); *B62M 27/02* (2013.01)

(58) Field of Classification Search
  CPC .............................. B62D 55/04; B62B 15/009
  See application file for complete search history.

(56) References Cited

U.S. PATENT DOCUMENTS

| | | |
|---|---|---|
| 2,460,178 A | 1/1949 | Kember |
| 2,478,653 A | 8/1949 | Callan |
| 2,841,249 A | 7/1958 | Allen |
| 2,925,970 A | 2/1960 | Heaslip |
| 2,961,249 A | 11/1960 | Petersen et al. |
| 3,010,682 A | 11/1961 | Moss et al. |
| 3,120,398 A | 2/1964 | Butterworth |
| 3,477,734 A | 11/1969 | Albertson |
| 3,523,697 A | 8/1970 | O'Sullivan |
| 3,570,616 A | 3/1971 | Taminaga |
| 3,570,617 A | 3/1971 | O'Day |
| 3,810,662 A | 5/1974 | Commanda |
| 7,051,828 B2 | 5/2006 | Murrin |
| 7,290,774 B2 | 11/2007 | Després |
| 8,191,905 B2* | 6/2012 | Beaudoin ............... B62M 27/02 280/809 |
| 8,505,929 B2 | 8/2013 | Lachance |
| 10,486,729 B2* | 11/2019 | DeLanghe ............. B62B 13/08 |
| 11,484,447 B2* | 11/2022 | Derenne ............. A61G 1/0237 |
| 2004/0000765 A1 | 1/2004 | Ouellette |
| 2004/0046338 A1* | 3/2004 | Ouellette ................ B62B 13/18 280/9 |
| 2006/0090939 A1* | 5/2006 | White .................... B62D 55/04 180/9.26 |
| 2006/0151983 A1* | 7/2006 | Despres ................. B62B 13/18 280/767 |
| 2010/0201087 A1 | 8/2010 | Beaudoin |

(Continued)

*Primary Examiner* — Brian L Swenson

(57) ABSTRACT

An electric linear actuator and retractable wheel assembly configured for use on a snowmobile is provided. The assembly includes bracket or base member configured to be attached to a ski of a snowmobile. The base member supports a linear actuator which is activated to rotate a transfer plate. The transfer plate simultaneously slides and pivots around a transfer shaft which guides and limits the movement of the transfer plate. A wheel is attached to the transfer shaft such that the wheel is configured to retract and protract relative to the ski of the snowmobile allowing the wheel to be used instead of the ski when the snowmobile is traveling on rough surfaces.

6 Claims, 7 Drawing Sheets

(56) References Cited

U.S. PATENT DOCUMENTS

| | | | |
|---|---|---|---|
| 2010/0259020 A1* | 10/2010 | Von Tersch | B60D 1/66 280/43.24 |
| 2012/0181758 A1* | 7/2012 | Lachance | B62B 13/18 280/9 |
| 2014/0001718 A1 | 1/2014 | Forcier | |
| 2015/0210133 A1* | 7/2015 | Lacombe | B62B 19/04 280/8 |
| 2018/0168897 A1* | 6/2018 | Jönsson | A61G 1/0268 |
| 2019/0176867 A1* | 6/2019 | Ouellette | B62M 27/02 |
| 2019/0248401 A1* | 8/2019 | Ferrer Almazan | B62M 27/02 |

* cited by examiner

D-D

E-E

FIG. 4A
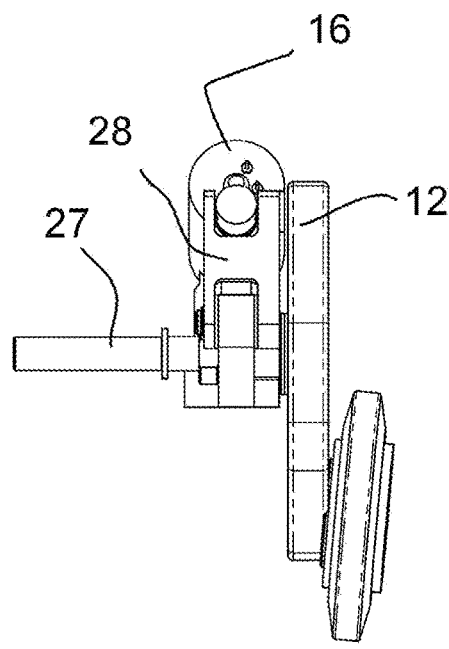
FIG. 4B
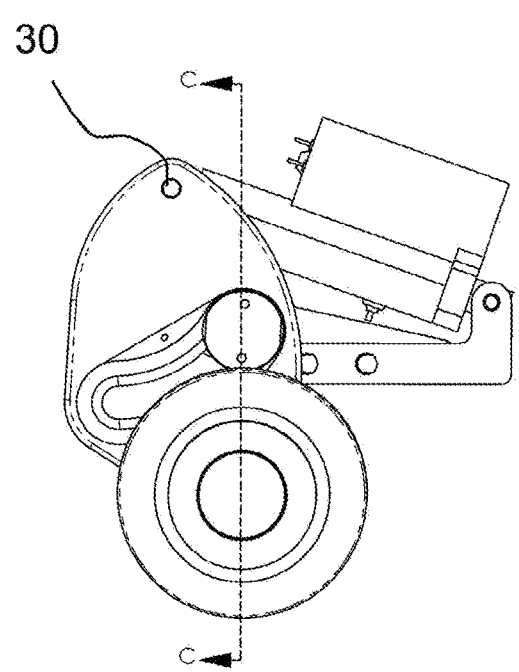
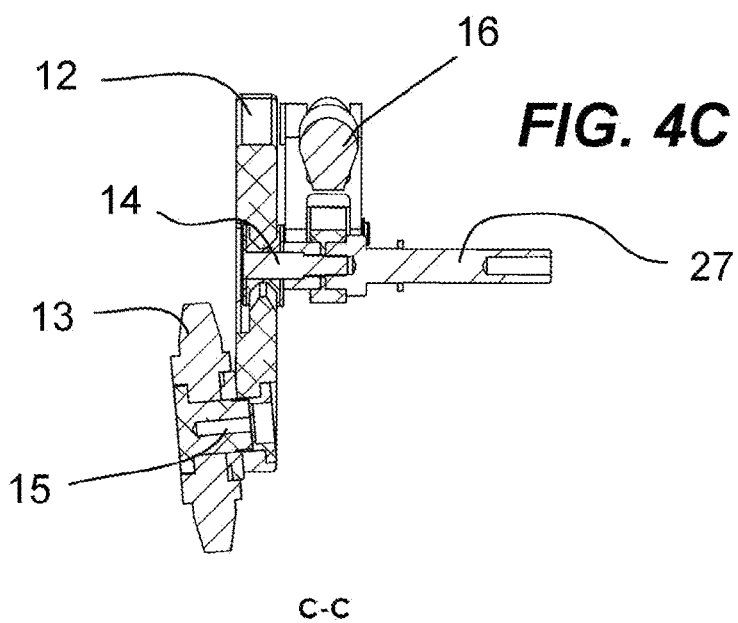
FIG. 4C
C-C

ELECTRIC LINEAR ACTUATOR FOR USE ON A RETRACTABLE WHEEL ASSEMBLY FOR USE ON SNOWMOBILES

CROSS-REFERENCE TO RELATED APPLICATIONS

The present application claims priority to application number GB2101668.8, filed on Feb. 5, 2021, the disclosure of which is hereby incorporated in its entirety at least by reference.

BACKGROUND OF THE INVENTION

1. Field of the Invention

The present invention relates generally to retractable wheel systems but more particularly to an electric linear actuator for use on a retractable wheel assembly for use on snowmobiles.

2. Description of Related Art

It is quite frequent for snowmobiles to have to occasionally cross roads having the asphalt exposed. Although the snowmobile can still travel on such surfaces, the bottom of the skis of the snowmobile is subject to scraping. It is noisy, sometimes makes sparks, and does not give a good feeling to whoever is riding the snowmobile, especially if it is a brand new snowmobile. There are wheel systems that have been invented, but they are complicated to install and don't work very well because the wheels are sometimes blocked as ice jams them during use. There are retractable wheel systems that operate on a hydraulic system but they are quite complicated and costly. There is room for improvement in this field. Consequently, an electric linear actuator for use on a retractable wheel assembly for use on snowmobiles is provided.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a main object of the present disclosure to provide for an electric linear actuator for use on a retractable wheel assembly for use on snowmobiles.

In order to do so, an electric linear actuator and retractable wheel assembly configured for use on a snowmobile, the assembly comprising a linear actuator having an upper portion and a lower portion, wherein the lower portion is supported by a base member and the upper portion is attached to a pivot arm; a transfer plate having a channel, the transfer plate configured to rotate about the pivot arm; a wheel rotatably attached to the transfer plate via a wheel axis shaft; an attachment element configured to attach the assembly to a ski of the snowmobile; and, wherein the wheel is configured to retract and protract relative to the attachment element when the linear actuator is activated via the transfer plate rotation.

In one embodiment, further comprising a transfer shaft attached to the base member and positioned within the channel of the transfer plate, wherein the transfer shaft is configured to guide and limit the rotation of the transfer plate. In one embodiment, the channel is curved. In one embodiment, the transfer plate is rotatably attached to the pivot arm via a rotational axis attachment pin. In one embodiment, the linear actuator is configured to be activated via a switch. In one embodiment, the attachment element is an attachment shaft.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 4A is a front view of the electric linear actuator for use on a retractable wheel assembly according to an embodiment of the invention.

FIG. 4B is a side view of the electric linear actuator for use on a retractable wheel assembly according to an embodiment of the invention.

FIG. 4C is a section view taken along section lines C-C of FIG. 4B

DETAILED DESCRIPTION OF THE PREFERRED EMBODIMENT

Figure 1:
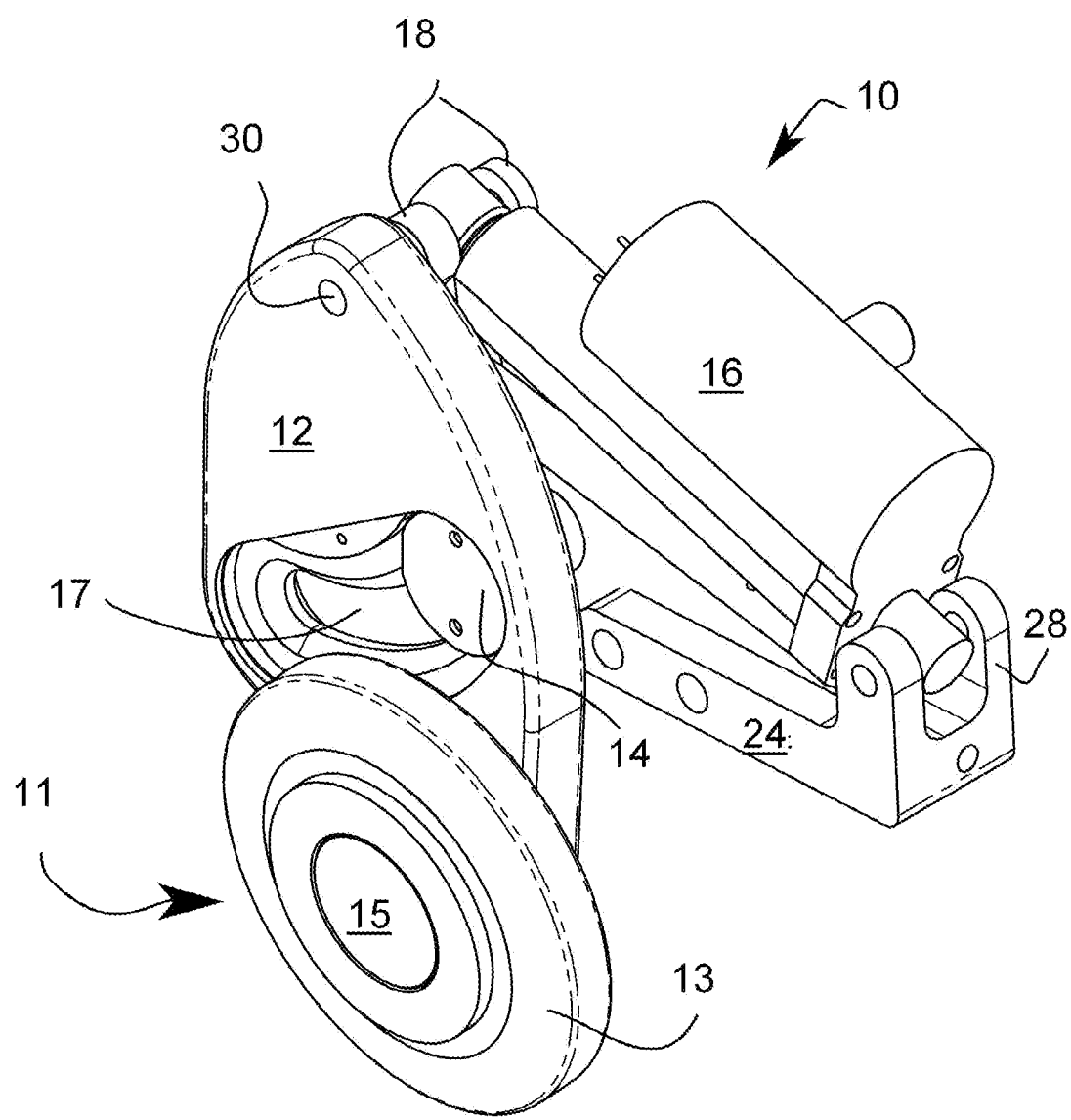
FIG. 1 is an isometric view of the electric linear and retractable wheel assembly configured for use on snowmobiles according to an embodiment of the invention.
Figure 2A:
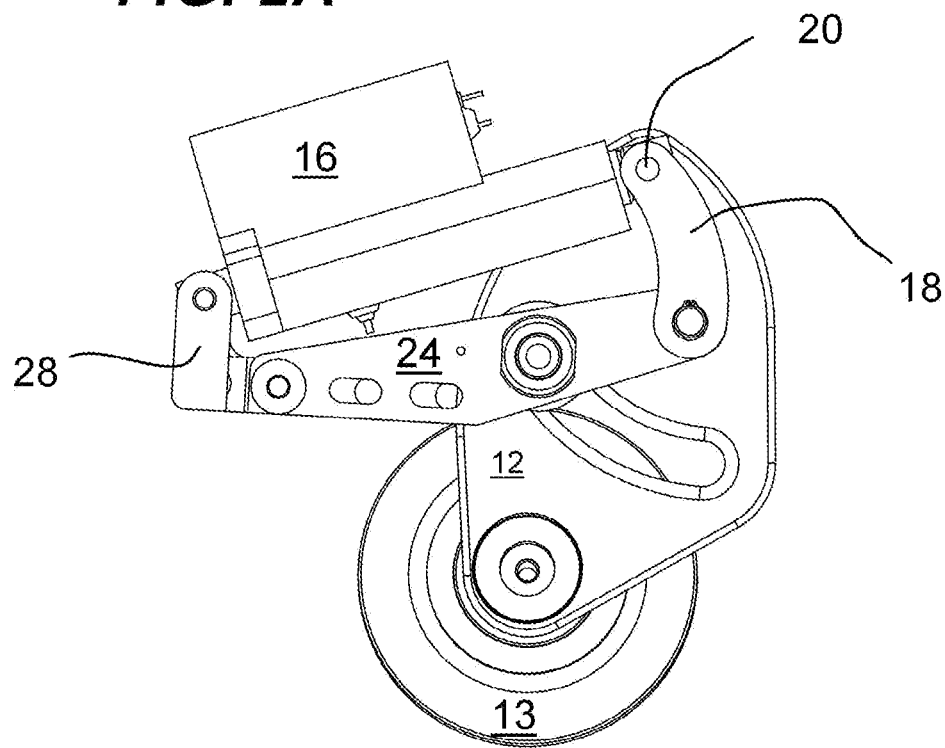
FIGS. 2A-B illustrate both side views of the wheel in its protracted configuration according to an embodiment of the invention.
Figure 2B:
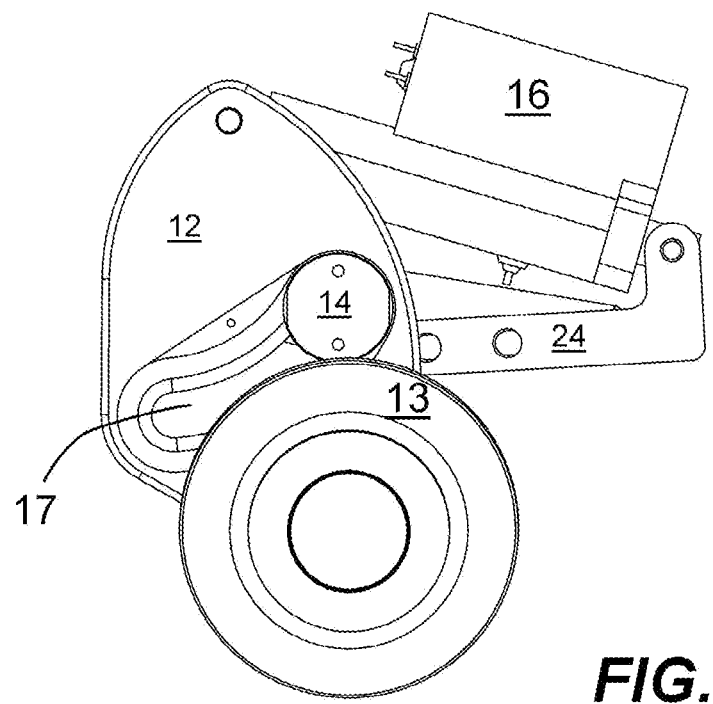
Figure 3A:
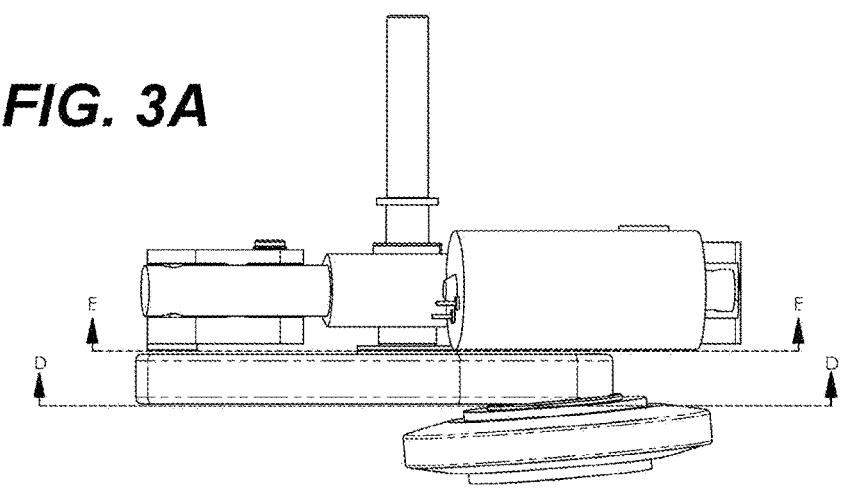
FIG. 3A is a top view of the electric linear actuator for use on a retractable wheel assembly according to an embodiment of the invention.
Figure 3B:
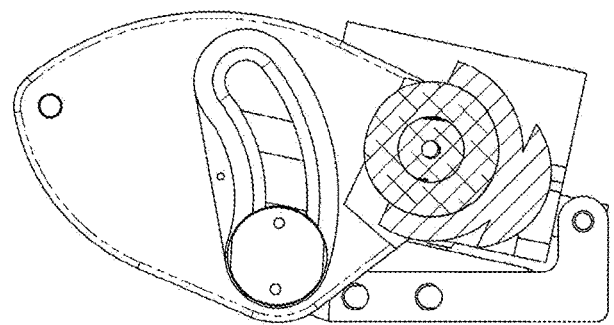
FIG. 3B is a cutaway view taken via lines D-D of FIG. 3A.
Figure 3C:
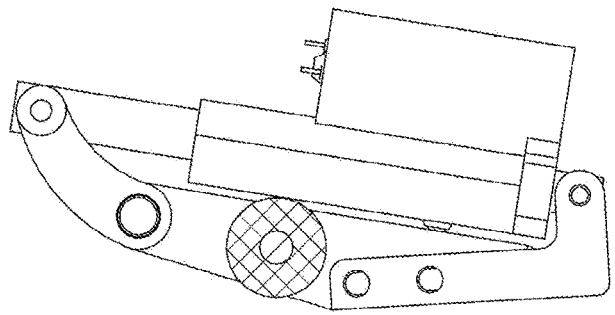
FIG. 3C is a cutaway view taken via lines E-E of FIG. 3A.
Figure 5A:
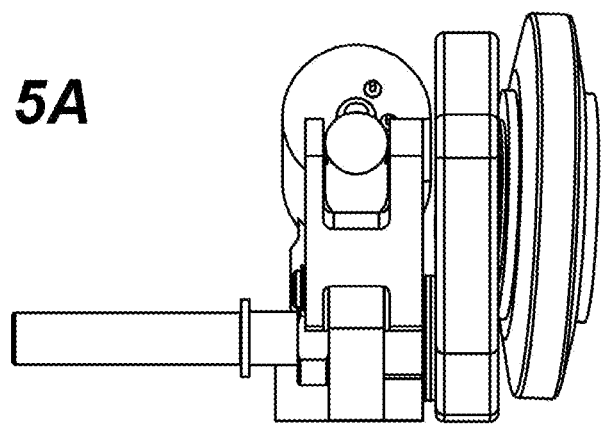
FIGS. 5A-C show a front and side views respectively with the wheel retracted according to an embodiment of the invention.
Figure 5B:
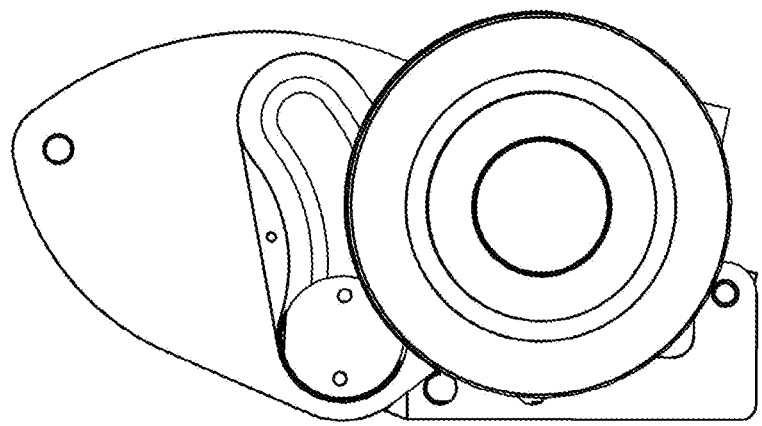
Figure 5C:
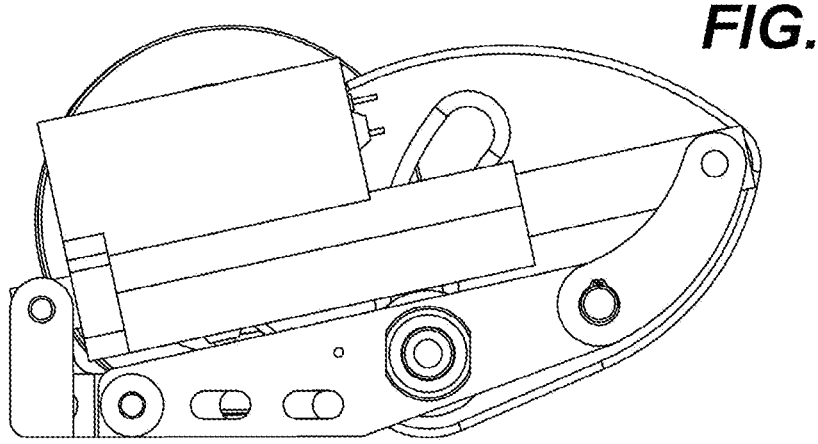
Figure 6:
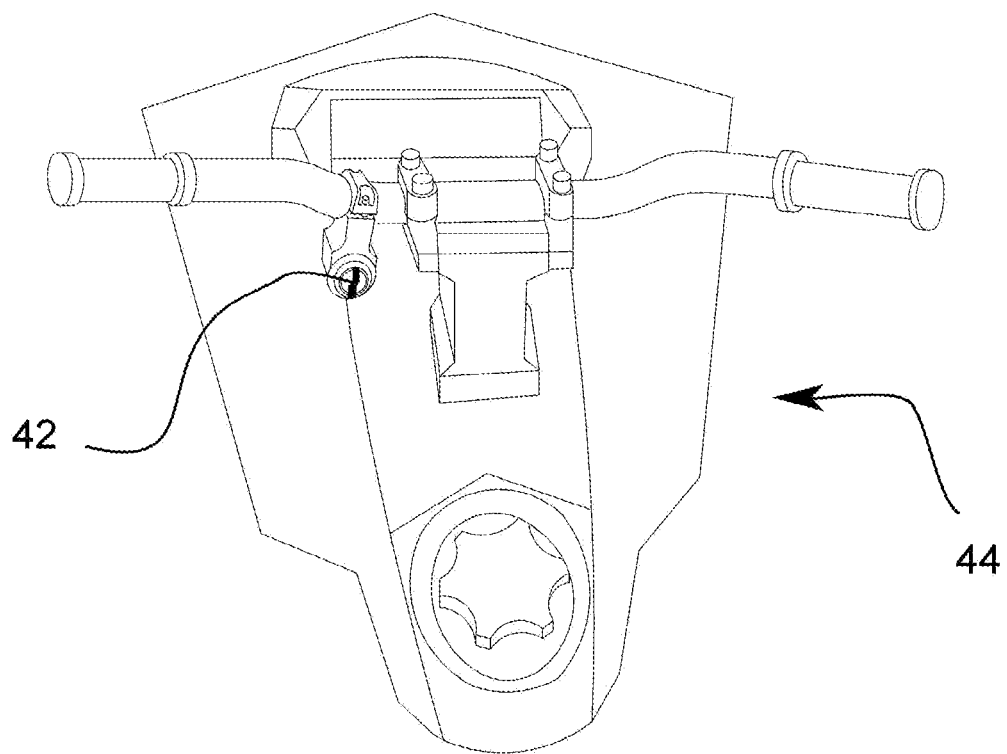
FIG. 6 is an isometric view showing the location of the actuating switch on a snowmobile according to an embodiment of the present invention.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide an electric linear actuator for use on a retractable wheel assembly configure for use on snowmobiles.

It is to be understood that the terminology used herein is for the purpose of describing particular embodiments only and is not intended to be limiting. The terms "a" or "an," as used herein, are defined as to mean "at least one". The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. The term "providing" is defined herein in its broadest sense, e.g., bringing/coming into physical existence, making available, and/or supplying to someone or something, in whole or in multiple parts at once or over a period of time. As used herein, the terms "about", "generally", or "approximately" apply to all numeric values, whether or not explicitly indicated. These terms generally refer to a range of numbers that one of skill in the art would consider near the stated amount by about 0%, 5%, or 10%, including increments therein. In many instances these terms may include numbers that are rounded to the nearest significant figure.

Referring now to any of the accompanying FIGS. 1-7, an electric linear actuator 10 and retractable wheel assembly 11 configured for use on snowmobiles 44 is illustrated. In one embodiment, the wheel assembly 11 includes a wheel 13. During use, the wheel 13 is configured to retract and protract relative to an attachment point, such as attachment shaft 27, which is attached to the ski 26 of a snowmobile. Advantageously, protracting or extending the wheel 13 lower in relation to the attachment point, allows the wheel 13 to be lower to the ground than the bottom surface of the ski 26, such that the bottom of surface of the ski does not touch the ground and only the wheel 13 is used. Useful when the snowmobile is traveling on a rough surface. As normally two skis are provided on most snowmobiles, two inventions may be used, one for each ski. The details and components of the invention will now be discussed in further details.

In one embodiment, the present invention further comprises a linear actuator 16 supported and positioned between connector member 28 and pivot arm 18, wherein the lower portion of the linear actuator 16 is attached to the connector member and the upper portion of the linear actuator 16 is attached to the pivot arm 18. Further, connector member 28 and the pivot arm 18 are attached to base member 24.

In one embodiment, a transfer shaft 14 is attached to the base member 24, wherein the transfer shaft 14 positioned within a channel 17 of transfer plate 12. In one embodiment, the transfer plate 12 is rotatably attached to pivot arm 18 via a rotational axis attachment pin 30. As the linear actuator 16 is activated via switch 42, the transfer plate 12 is configured to pivot or rotate the range of the channel 17 in one direction depending on the linear actuators position via the activation switch, i.e. retract (up) or protract (down). In one embodiment, the channel 17 is shaped with a slight C-shape, curve, or arch enabling the transfer plate 12 to slide around the transfer shaft 14. The transfer shafts position within the channel determines if the wheel 13 is in the protracted or retracted position, as the transfer plate 12 is attached to wheel 13 via a wheel axis shaft 15. It should be understood, that the shape and size of the transfer plate 12 and channel 17 may vary as needed to control the range of motion of the wheel 13.

In one embodiment, the pivot arm 18 acts as a holder and a guide for the linear actuator 16 as the linear actuator induces the slide and rotate function of the transfer plate 12 and the transfer plate rotates about the pivot arm and pins 20 and 30.

Figure 7A:
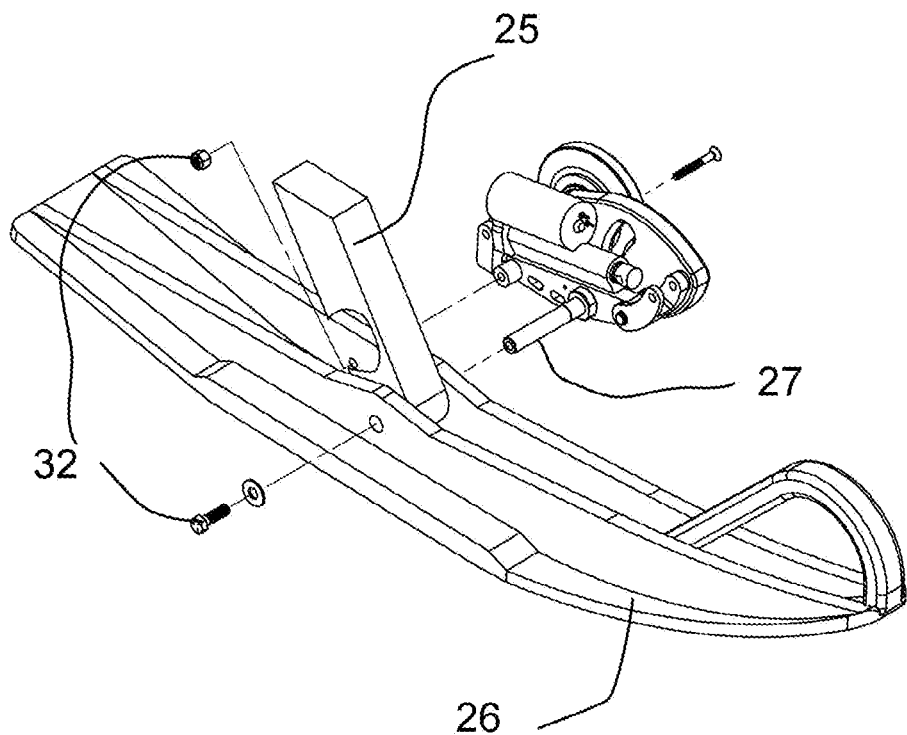
FIG. 7A is an isometric exploded view showing the installation of the present invention on a snowmobile according to an embodiment of the present invention.
Figure 7B:
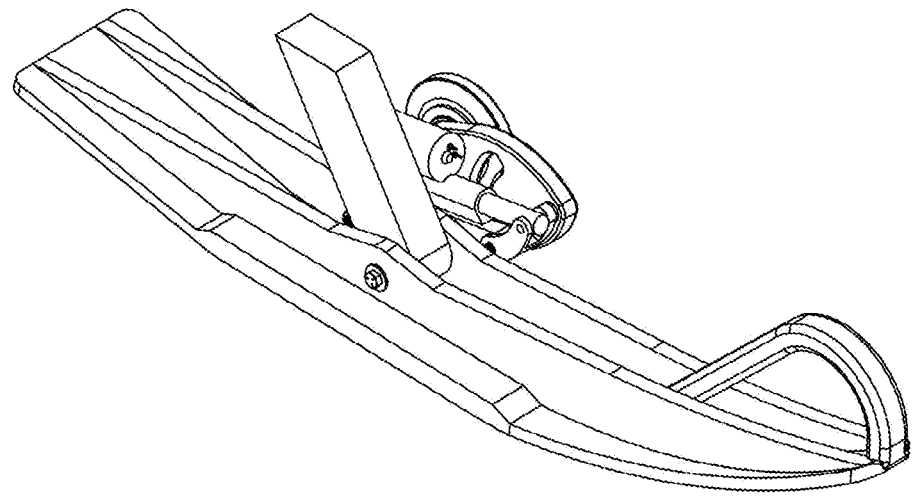
FIG. 7B is an isometric view showing the present invention installed on a snowmobile according to an embodiment of the present invention.

Best seen in FIGS. 7A-B, in one embodiment, the assembly of the present invention is configured to attach to ski 26 via mechanical fasteners 32, wherein the mechanical fasteners 32 are configured to attach to the attachment shaft 27 and to a secondary connector 25.

As previously mentioned, during operation, when moving, the wheel 13 is configured to move from a retracted configuration to a protracted configuration. This configuration is enabled when the linear actuator 16 retracts, so as to pull on the pivot arm rotational axis attachment pin 30 and the pivot arm 18 which connects the transfer plate 12, the linear actuator 16, and the pivot arm 18 so that they all move together to move the wheel 13 to its protracted configuration. When the linear actuator 16 protracts, it reverses the operation so as to move the wheel 13 back to its retracted configuration. In one embodiment, a simple electrical connection by way of a shielded cable 40 connected to a battery (not shown) and controlled via switch 42 to retract or protract the wheels 13.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. An electric linear actuator and retractable wheel assembly configured for use on snowmobiles, comprising:
   a transfer plate having a channel;

a transfer shaft attached to a base member and positioned within the channel of the transfer plate;

a wheel attached to the transfer plate via a wheel axis shaft;

a pivot arm rotatably connected to the transfer plate via a rotational axis attachment pin positioned at an end of the transfer plate opposite the transfer shaft, a linear actuator having a lower portion attached to a connector member and an upper portion attached to the pivot arm, wherein the connector member and the pivot arm are attached to the base member;

wherein the pivot arm and the rotational axis attachment pin are positioned at a highest point above a ski of the snowmobile to minimize exposure to snow and ice buildup;

whereby activation of the linear actuator causes the pivot arm and the rotational axis attachment pin to move the transfer plate and the channel about the transfer shaft, thereby moving the wheel between a retracted position and a protracted position relative to the ski.

2. The assembly of claim 1, further comprising a transfer shaft attached to the base member and positioned within the channel of the transfer plate, wherein the transfer shaft is configured to guide and limit the rotation of the transfer plate.

3. The assembly of claim 1, wherein the channel is curved.

4. The assembly of claim 1, wherein the transfer plate is rotatably attached to the pivot arm via a rotational axis attachment pin.

5. The assembly of claim 1, wherein the linear actuator is configured to be activated via a switch.

6. The assembly of claim 1, wherein the attachment element is an attachment shaft.

* * * * *